United States Patent [19]

Tanaka

[11] Patent Number: 5,321,822
[45] Date of Patent: Jun. 14, 1994

[54] INFORMATION PROCESSING SYSTEM WITH ADDRESSING EXCEPTION

[75] Inventor: Katsumi Tanaka, Tokyo, Japan

[73] Assignee: NEC Corporation, Tokyo, Japan

[21] Appl. No.: 657,780

[22] Filed: Feb. 21, 1991

[30] Foreign Application Priority Data

Feb. 21, 1990 [JP] Japan .................... 2-41902

[51] Int. Cl.[5] ............................................ G06F 12/00
[52] U.S. Cl. ...................... 395/400; 395/425
[58] Field of Search ............................ 395/400, 425

[56] References Cited

U.S. PATENT DOCUMENTS

| | | | |
|---|---|---|---|
| 3,222,649 | 12/1965 | King et al. | 395/400 |
| 3,938,096 | 2/1976 | Brown et al. | 395/400 |
| 4,177,510 | 12/1979 | Appell et al. | 395/425 |
| 4,870,569 | 7/1989 | Nakatani et al. | 395/425 |

*Primary Examiner*—Joseph L. Dixon
*Attorney, Agent, or Firm*—Foley & Lardner

[57] ABSTRACT

An arrangement for producing first to third effective addresses by processing an indirect designation processing instruction indicated by its code. An address register first memorizes, as the first effective address, an indirect descriptor address. An address register memorizes this latter portion as the second effective address instead of the first one. This makes the main memory produce a direct designation data descriptor comprising a direct designation indicating and a direct designation address portion. Meanwhile, a storing circuit stores the code and the first effective address in a first part of a buffer memory. The storing circuit stores this portion and the second effective address in the first part instead of the code and the first effective address. The address register now memorizes the direct designation address portion as the third effective address instead of the second one to make the main memory produce an operand datum. Meanwhile, the storing circuit is energized by the direct designation indicating portion and stores this portion and the third effective address in a second part of the buffer memory.

3 Claims, 3 Drawing Sheets

INDIRECT DESIGNATION EFFECTIVE ADDRESS PROCESSING INSTRUCTION 21

*FIG. 5*

INFORMATION PROCESSING SYSTEM WITH ADDRESSING EXCEPTION

BACKGROUND OF THE INVENTION

This invention relates to an effective address producing and storing apparatus or arrangement supplied with an indirect designation effective address processing instruction for producing a succession of a plurality of effective addresses comprising first, second, and third effective addresses and for successively storing the first through third effective addresses in a buffer memory of a configuration which includes an information processing system comprising a main memory, a reading apparatus or arrangement, and the buffer memory.

The buffer memory is used in administering an addressing exception which occurs when the reading arrangement attempts to access an unavailable location of the main memory. The unavailable location is equivalent in meaning to a location which is not available in the configuration.

The main memory is for memorizing an operand datum at an operand address, a direct designation data descriptor at a direct descriptor address, and an indirect designation data descriptor at an indirect descriptor address. The direct designation data descriptor comprises a direct designation indicating portion and a direct designation address portion representative of the operand address. The direct designation indicating portion indicates direct designation for the operand datum. The indirect designation data descriptor comprises an indirect designation indicating portion and an indirect descriptor address portion representative of the direct descriptor address. The indirect designation indicating portion indicates indirect designation for the operand datum.

The indirect designation effective address processing instruction comprises an indirect designation indicating code and a source address section representative of the indirect descriptor address. The indirect designation indicating code indicates indirect designation for the operand datum.

A conventional effective address producing and storing apparatus or arrangement comprises an instruction register having first and second instruction register areas for memorizing the indirect designation indicating code and the source address section. Connected to the second instruction register area, a source address processing circuit processes the source address section into a source accessing signal representative of the indirect descriptor address.

Connected to the source address processing circuit, an effective address register memorizes the source accessing signal as the first effective address and uses the source accessing signal in making the reading arrangement access to the indirect descriptor address and read the indirect designation data descriptor as a first read-out data descriptor. The effective address register is connected to the buffer memory. Connected to the buffer memory, a storing circuit stores the first effective address in a first part of the buffer memory.

A descriptor register is connected to the indirect descriptor address of the main memory. The descriptor register has first and second descriptor register areas for memorizing, as a first designation indicating portion and a first designation address portion, the indirect designation indicating and the indirect descriptor address portions, respectively, which are had by the indirect designation data descriptor read as the first read-out data descriptor.

Connected to the second descriptor register area and the effective address register, an updating circuit updates the effective address register to make the effective address register memorize the first designation address portion as the second effective address instead of the first effective address. The effective address register thereby uses the first designation address portion in making the reading arrangement access to the direct descriptor address and read the direct designation data descriptor as a second read-out data descriptor. The storing circuit stores the second effective address in a second part of the buffer memory.

The descriptor register is furthermore connected to the direct descriptor address of the main memory. The descriptor register memorizes, as a second designation indicating portion and a second designation address portion instead of the first designation indicating and the first designation address portions, the direct designation indicating and the direct descriptor address portions, respectively, which are had by the direct designation data descriptor read as the second read-out data descriptor.

The updating circuit updates the effective address register to make the effective address register memorize the second designation address portion as the third effective address instead of the second effective address. The effective address register thereby uses the second designation address portion in making the reading arrangement access to the operand address and read the operand data. The storing circuit stores the third effective address in a third part of the buffer memory.

Thus, the conventional effective address producing and storing arrangement successively stores the first through the third effective addresses in the first through the third parts of the buffer memory, respectively. Thereafter, supplied with another indirect designation effective address processing instruction, the conventional effective address producing and storing arrangement produces another succession of a plurality of effective addresses and successively stores the effective addresses in different parts of the buffer memory that are different from the first through the third parts of the buffer memory.

The conventional effective address producing and storing arrangement is operable in cooperation with the information processing system in a pipeline fashion of first, second, third, and several subsequent pipeline stages. The first pipeline stage is carried out by the instruction and the descriptor registers. The second pipeline stage is dealt with by the effective address register. The third pipeline stage is carried out by the buffer memory. The subsequent stages are dealt with by the reading arrangement and the main memory.

Inasmuch as the conventional effective address producing and storing arrangement produces a succession of a plurality of effective addresses in accordance with the indirect designation effective address processing instruction and successively stores the effective addresses in different parts of the buffer memory and inasmuch as each of the effective addresses is typically thirty-one bits long, an overflow of the effective address which should be stored in the buffer memory, is liable to occur in the buffer memory when the conventional effective address producing and storing arrangement is supplied with the indirect designation effective address processing instruction which makes the conventional effective address producing and storing arrangement produce an increased number of the effective addresses. The overflow causes the pipeline of the information processing system to become clogged and degrades performance of the information processing system. In particular, the overflow makes it impossible to accurately deal with the addressing exception which occurs at the subsequent pipeline stages immediately after the overflow occurs. This is because the effective address in question overflows and is not perfectly stored in the buffer memory.

To avoid the overflow, another conventional effective address producing and storing apparatus or arrangement comprises another storing circuit which successively stores a plurality of the effective addresses in a same part of the buffer memory. That is, only a trailing one of the effective addresses remains in the buffer memory for each of the indirect designation effective address processing instructions. The trailing one of the effective addresses is equivalent to the direct designation address portion representative of the operand address. When an addressing exception occurs at the subsequent pipeline stages immediately after the trailing one of the effective addresses is stored in the buffer memory, operation of the information processing system is terminated for the trailing one of the effective addresses in question in a manner known in the art. It will be supposed that the trailing one of the effective addresses and a preceding effective address immediately preceding the trailing one of the effective addresses are necessary as an exception address and a preceding factor address, respectively, in processing the addressing exception in the information processing system which operates under the control of exception processing firmware with reference to the buffer memory. The exception address is equivalent in meaning to an effective address at which the addressing exception occurs and which designates the operand address. The preceding factor address is equivalent in meaning to another effective address which precedes the exception address and which designates the direct description address. In this case, the information processing system cannot deal with the addressing exception. This is because the preceding effective address does not remain in the buffer memory as the preceding factor address.

SUMMARY OF THE INVENTION

It is therefore an object of this invention to provide an effective address producing and storing apparatus or arrangement which is capable of making an information processing system deal accurately with an addressing exception.

It is another object of this invention to provide an effective address producing and storing apparatus or arrangement of the type described, wherein an overflow of effective addresses is not liable to occur in a buffer memory.

It is still another object of this invention to provide an effective address producing and storing apparatus or arrangement of the type described, which makes it possible to deal with an addressing exception in an information processing system which needs not only an exception address equivalent to an operand address but also a preceding factor address equivalent to a direct descriptor address preceding the operand address in processing the addressing exception.

Other objects of this invention will become clear as the description proceeds.

The invention is an effective address producing and storing apparatus supplied with an indirect designation effective address processing instruction for producing a succession of first, second, and third effective addresses, and for successively storing the first through third effective addresses in a buffer memory of a information processing system. The information processing system includes a main memory, a reading apparatus and the buffer memory.

The main memory memorizes an operand datum at an operand address, a direct designation data descriptor at a direct descriptor address and an indirect designation data descriptor at an indirect descriptor address. The direct designation data descriptor includes a direct designation indicating portion and a direct designation address portion representative of the operand address. The indirect designation data descriptor includes an indirect designation indicating portion and an indirect designation address portion representative of the direct descriptor address. The indirect designation effective address processing instruction includes an indirect designation indicating code and a source address section representative of the indirect descriptor address.

The effective address producing and storing apparatus includes an instruction register, a source address processing means, and effective address register, storing means, a descriptive register and updating means.

The instruction register has first and second instruction register areas for memorizing the indirect designation indicating code and the source address section. The first instruction register area is connected to the buffer memory.

The source address processing means is connected to the second instruction register area for processing the source address section into a source accessing signal representative of the indirect descriptor address.

An effective address register is connected to the source address processing means and the reading apparatus for memorizing the source accessing signal as the first effective address to use the source accessing signal in making the reading apparatus accessible to the first indirect descriptor address in the main memory and to read the indirect designation data descriptor as a first readout data descriptor. The effective address register is connected to the buffer memory.

A storing means is connected to the buffer memory and the first instruction register area for storing the first effective address and the indirect designation indicating code in a first part of the buffer memory.

The descriptor register is connected to the main memory. It has first and second descriptor register areas for memorizing as a first designation indicating portion and a first designation address portion the indirect designation indicating and the indirect designation address portions, respectively, which are included in the indirect designation data descriptor read as the first readout data descriptor. The first descriptor register area is connected to the buffer memory.

Updating means are connected to the second descriptor register area and the effective address register for updating the effective address register, to make the effective address register memorize the first designation address portion as the second effective address, instead of the first effective address.

The effective address register thereby uses the first designation address portion and makes the reading apparatus access to the direct descriptor address in the main memory and read the direct designation data descriptor as a second readout data descriptor.

The storing means is, furthermore, connected to the first descriptor register area for storing the second effective address and the first designation indicating portion in the first part of the buffer memory instead of the first effective address and the indirect designation indicating code.

The descriptor register is, furthermore, connected to the main memory for memorizing, as a second designation indicating portion and a second designation address portion instead of the first designation indicating and the first designation address portions, the direct designation indicating and direct designation address portions, respectively, which are included in the direct designation data descriptor read as the second readout data descriptor.

The updating means further updates the effective address register. This makes the effective address register memorize the second designation address portion as the third effective address, instead of as the second effective address.

The effective address register thereby uses the second designation address portion in making the reading apparatus access to the operand address and read the operand datum.

The storing means stores the third effective address in the second designation indicating portion in a second part of the buffer memory.

It will be understood in connection with the explanation above that the first part of the buffer memory is first energized for storage of the first effective address and the indirect designation indicating code by the storing means in compliance with the indirect designation indicating code memorized in the first instruction register area. The storing means again energizes the first part for storage of the second effective address and the first designation indicating portion in compliance with the first designation indicating portion memorized in the first descriptor register area. The second part of the buffer memory is energized by the storing means in compliance with the second designation indicating portion which is memorized at this instant of time in the first descriptor register area.

DESCRIPTION OF THE PREFERRED EMBODIMENT

Figure 1:
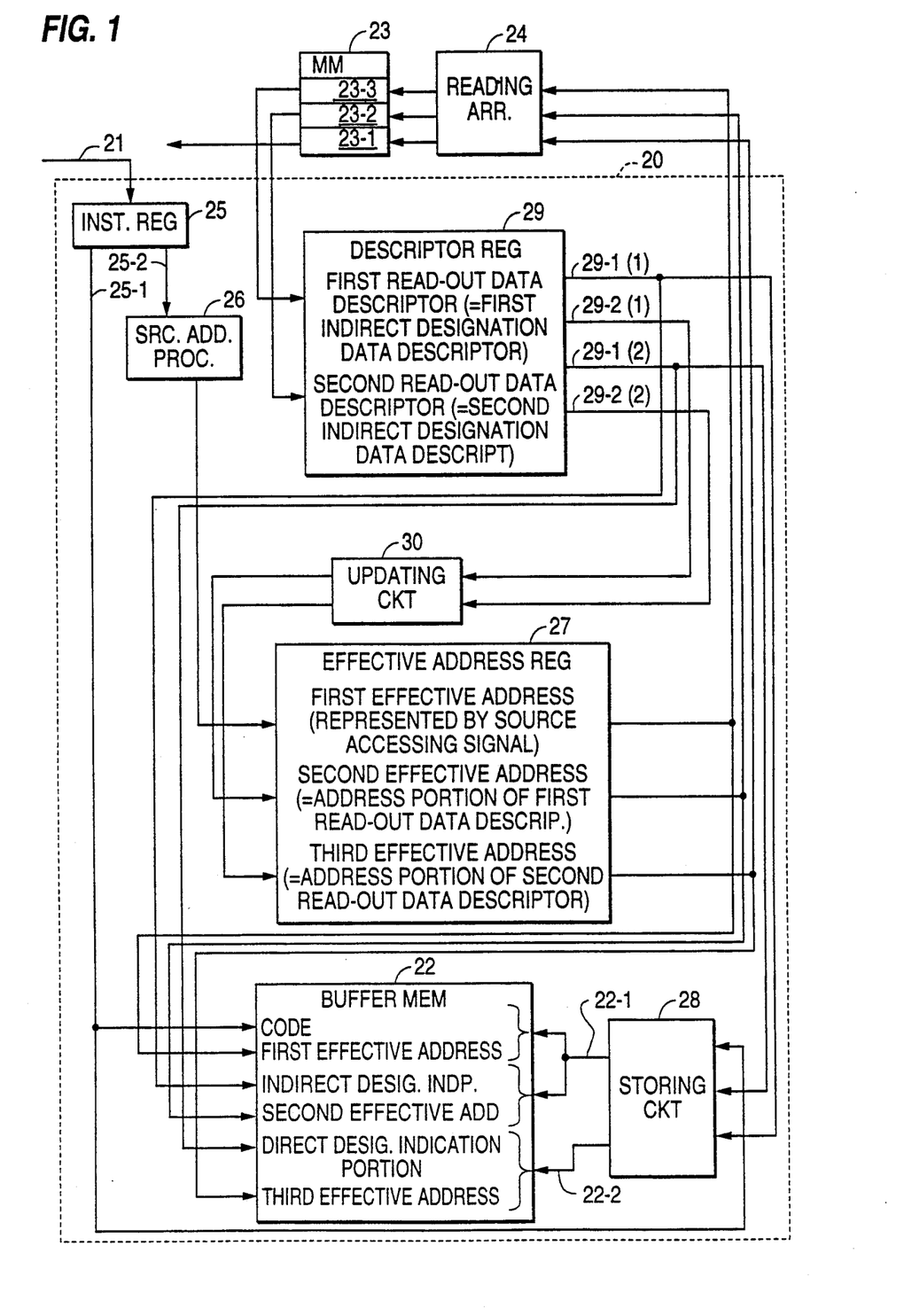
FIG. 1 is a block diagram of an information processing system comprising an effective address producing and storing apparatus or arrangement according to an embodiment of this invention, FIG. 1 additionally shows the operation of the information processing system.

Referring to FIG. 1, an effective address producing and storing apparatus or arrangement 20 according to an embodiment of this invention is supplied with an indirect designation effective address processing instruction 21 for producing a succession of a plurality of effective addresses comprising first, second, and third effective addresses and for successively storing the first through the third effective addresses in a buffer memory 22 of a configuration which includes an information processing system comprising a main memory 23, a reading apparatus or arrangement 24, and the buffer memory 22. The buffer memory 22, the main memory 23, and the reading arrangement 24 are labelled BUFFER MEM, MM, and READING ARR., respectively.

The buffer memory 22 is used in administrating an address exception which occurs when the reading arrangement 24 attempts to access to an unavailable location of the main memory 23 that is not available in the configuration.

Figure 2:
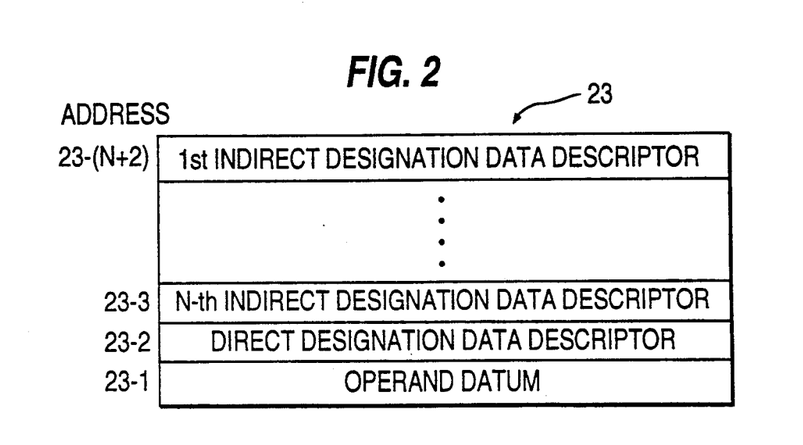
FIG. 2 is a diagram for use in describing a main memory which is used in the information processing system illustrated in FIG. 1.

Turning to FIG. 2, the main memory 23 memorizes an operand datum at an operand address 23-1, a direct designation data descriptor at a direct descriptor address 23-2, and an indirect designation data descriptor at an indirect descriptor address 23-3. The direct designation data descriptor comprises a direct designation indicating portion and a direct designation address portion representative of the operand address 23-1. The direct designation indicating portion indicates direct designation for the operand datum. The indirect designation data descriptor comprises an indirect designation indicating portion and an indirect descriptor address portion representative of the direct descriptor address 23-2. The indirect designation indicating portion indicates indirect designation for the operand datum.

Figure 3:
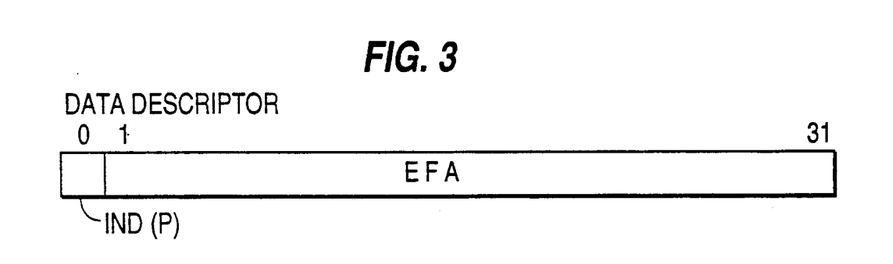
FIG. 3 is another diagram of a data descriptor which is memorized in the main memory illustrated in FIG. 2.

Turning to FIG. 3 and continuing reference to FIG. 2, each of the direct and the indirect designation data descriptors 23-2 and 23-3 is, for example, thirty-two bits long and has a most significant bit (that is, a zeroth bit) IND(P) and thirty-one remaining bits EFA. The direct designation data descriptor 23-2 has the most significant bit INS(P) of a logic "0" level as the direct designation indicating portion and the remaining bits EFA which serves as the direct designation address portion representative of the operand address. The indirect designation data descriptor 23-3 has the most significant bit IND(P) of a logic "1" level as the indirect designation indicating portion and the remaining bits EFA which serves as the indirect designation address portion representative of the direct descriptor address.

Figure 4:
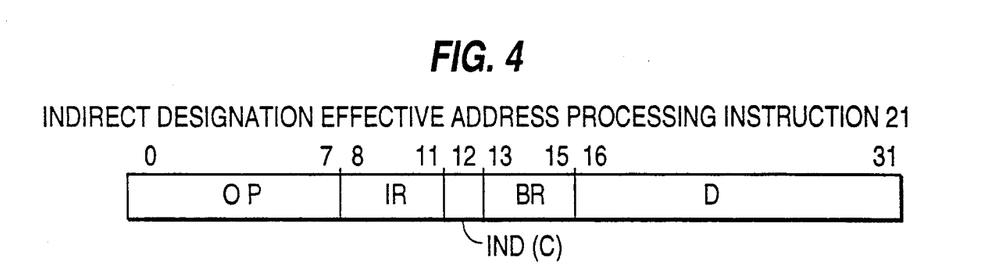
FIG. 4 is another diagram of an indirect designation effective address processing instruction which is used in the effective address and storing arrangement included in the information processing system illustrated in FIG. 1.

Turning to FIG. 4, the indirect designation effective address processing instruction 21 is also thirty-two bits long and comprises an operation code OP of zeroth through seventh bits, an index register number code IR of eighth through eleventh bits, an indirect designation indicating code IND(C) of a twelfth bit, a base register number code BR of thirteenth through fifteenth bits, and a displacement indicator D of sixteenth through thirty-first bits.

The operation code OR indicates an effective address processing operation. The index register number code IR indicates an index register number of one of index registers (later illustrated) that memorizes a particular index address. The indirect designation indicating code IND(C) has a logic "1" level to indicate indirect designation for the operand datum. The base register number code BR indicates a base register number of one of base registers (later illustrated) that memorizes a particular base address. The displacement indicator D indicates a displacement from a first added address given by adding the particular index address and the particular base address together. A second added address is given by a sum of the first added address and the displacement and represents the indirect descriptor address 23-3 (FIGS. 1 and 2) of the indirect designation data descriptor. In this connection, the index register number code IR, the base register number code BR, and the displacement indicator D are collectively referred to as a source address section representative of the indirect descriptor address 23-3.

Turning back to FIG. 1 and referring to FIGS. 2 through 4, the effective address producing and storing arrangement 20 comprises an instruction register 25 having first and second instruction register areas which are indicated by signal lines 25-1 and 25-2 and are for memorizing the indirect designation indicating code IND(C) of logic "1" level and the source address section (namely, a combination of the index register number code IR, the base register number code BR, and the displacement indicator D). The first instruction register area 25-1 is connected to the buffer memory 22.

A source address processing circuit 26 is connected to the second instruction register area 25-2. The source address processing circuit 26 processes the source address section in the following manner into a source accessing signal representative of the indirect descriptor address 23-3.

Figure 5:
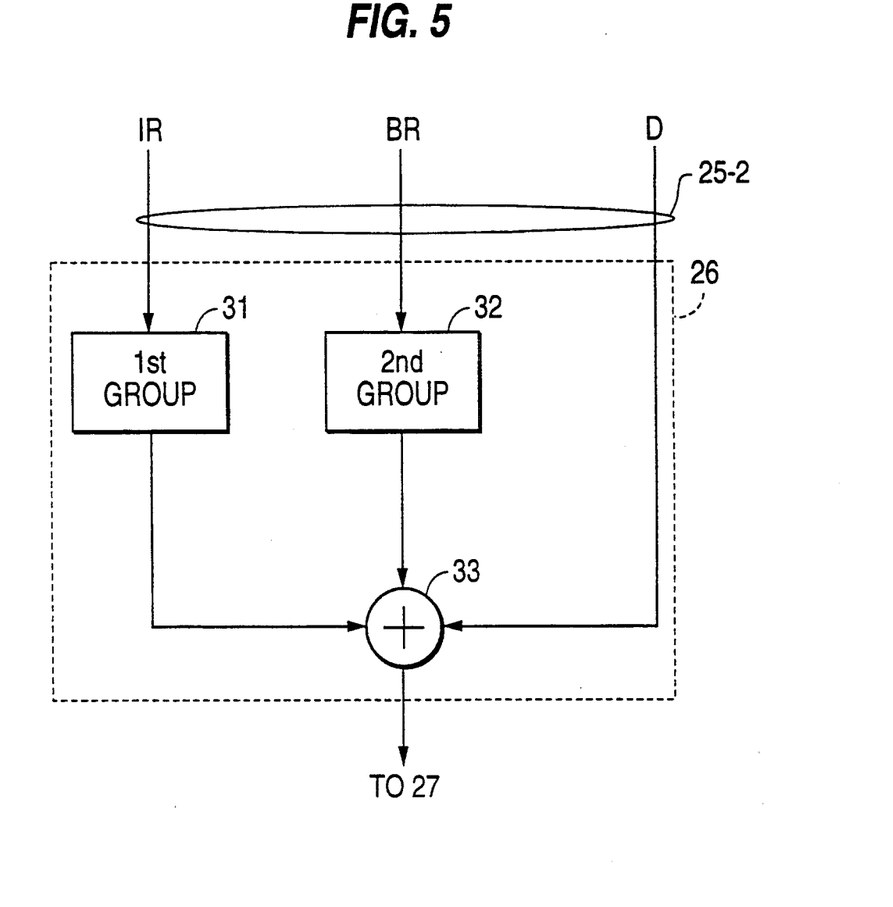
FIG. 5 is a block diagram of a source address processing circuit of the effective address producing and storing apparatus or arrangement included in the information processing system illustrated in FIG. 1.

Turning to FIG. 5, the source address processing circuit 26 comprises a first group 31 of the index registers, a second group 32 of the base registers, and an adder 33. Supplied with the index register number code IR, the first group 31 produces the above-mentioned particular index address. Supplied with the base register number code BR, the second group 32 produces the above-mentioned particular base address. Supplied with the particular index and particular base addresses and the displacement indicator D indicative of the above-mentioned displacement, the adder 33 produces a sum signal representative of a sum of the particular index and particular base addresses and the displacement as the source accessing signal representative of the indirect descriptor address 23-3.

Turning back to FIG. 1 again and referring to FIGS. 2 through 4, an effective address register 27 is connected to the source address processing circuit 26 and the reading arrangement 24. The effective address register 27 memorizes the source accessing signal as the first effective address and uses the source accessing signal in making the reading arrangement 24 access to the indirect descriptor address 23-3 and read the indirect designation data descriptor as a first read-out data descriptor. More strictly speaking, the source access signal is memorized in the effective address register 27 as a signal representative of the first effective address. The effective address register 27 is connected to the buffer memory 22. This use of the source accessing signal as the first effective address is illustrated in FIG. 1 by a first or top signal line drawn rightwards from the effective address register 27.

A storing circuit 28 is connected to the buffer memory 22 and the first instruction register area 25-1. The storing circuit 28 stores the first effective address and the indirect designation indicating code IND(C) of the logic "1" level in a first part of the buffer memory 28 by energizing the first part. It should be understand that the first part of the buffer memory 22 is depicted in FIG. 1 by a first storage connection line 22-1.

A descriptor register 29 is connected to the indirect descriptor address 23-3. The descriptor register 29 has first and second descriptor register areas for memorizing, as a first designation indicating portion and a first designation address portion, the indirect designation indicating portion IND(P) of the logic "1" level and the indirect descriptor address portion EFA, respectively, which are had by the indirect designation data descriptor read as the first read-out data descriptor. It should be understood that the first descriptor register area of the descriptor register 29 is depicted in the figure by a pair of connection lines 29-1(1) and 29-1(2). The second descriptor register area of the descriptor register 29 is shown by another pair of connection lines 29-2(1) and 29-2(2). The first descriptor register area is connected to the buffer memory 22 through the connection lines 29-1(1) and 29-1(2).

Connected to the second descriptor register area through the connection lines 29-2(1) and to the effective address register 27, an updating circuit 30 updates or renews the effective address register 27 to make the effective address register 27 memorize the first designation address portion as the second effective address instead of the first effective address. The effective address register 27 thereby uses the first designation address portion in making the reading arrangement 24 access to the direct descriptor address 23-2 and read the direct designation data descriptor as a second read-out data descriptor. This use of the first designation address portion is depicted in FIG. 1 by a second or middle signal line extended rightwardly from the effective address register 27.

The storing circuit 28 is furthermore connected to the first descriptor register area through connection lines 29-1(1) and 29-1(2). The storing circuit 28 stores the second effective address and the first designation indicating portion in the first part of the buffer memory 22 by again energizing the first part by the first storage connection line 22-1. It will be seen that the first storage connection line 22-1 is bifurcated near the buffer memory 22 to indicate that the first part is twice energized.

The descriptor register 29 is furthermore connected to the direct descriptor address 23-2. The descriptor register 29 memorizes, as a second designation indicating portion and a second designation address portion and instead of the first designation indicating and the first designation address portions, the direct designation indicating portion IND(P) of the logic "0" level and the direct descriptor address portion EFA, respectively, which are had by the direct designation data descriptor read as the second read-out data descriptor.

Connected to the second descriptor register area through the connection line 29-2(2), the updating circuit 30 updates the effective address register 27 to make the effective address register 27 memorize, instead of the second effective address the second designation address portion as the third effective address. The effective address register 27 thereby uses the second designation address portion in making the reading arrangement 24 access to the operand address 23-1 and read the operand datum. This use of the second designation address portion is indicated by a third or bottom signal line depicted below the second signal line. The storing circuit 28 stores the third effective address and the second designation indicating portion in a second part of the buffer memory 22 by energizing the second part. The second part of the buffer memory 22 is shown in FIG. 1 by another storage connection line 22-2.

Thus, operation of the effective address producing and storing arrangement 20 comes to an end for the indirect designation effective address processing instruction 21. In this state of the information processing system, the third effective address and the second designation indicating portion equivalent to the direct designation indicating portion IND(P) of the logic "0" level remain in the second part of the buffer memory 22 with the second effective address and the first designation indicating portion equivalent to the indirect designation indicating portion IND(P) of the logic "1" level kept in the first part of the buffer memory 22.

Thereafter, supplied with the indirect designation effective address processing instruction 21 again, the effective address producing and storing arrangement 20 operates in the similar manner so that the second effective address and the first designation indicating portion equivalent to the indirect designation indicating portion IND(P) of the logic "1" level remain in a third part of the buffer memory 22 and that the third effective address and the second designation indicating portion equivalent to the direct designation indicating portion IND(P) of the logic "0" level remain in a fourth part of the buffer memory 22.

The effective address producing and storing arrangement 20 is operable in cooperation with the information processing system in a pipeline fashion of first, second, third, and several subsequent pipeline stages like the conventional effective address producing and storing arrangement described in the preamble of the instant specification. That is, the first pipeline stage is carried out by the instruction and the descriptor registers 25 and 29. The second pipeline stage is dealt with by the effective address register 27. The third pipeline stage is carried out by the buffer memory 22. The subsequent stages are dealt with by the reading arrangement 24 and the main memory 23.

Inasmuch as the effective address producing and storing arrangement 20 successively stores the first and the second effective addresses equivalent to the indirect and the direct descriptor addresses 23-3 and 23-2 among the first through the third effective addresses in a same part (namely, the first part) of the buffer memory 22 and inasmuch as the effective address producing and storing arrangement 20 stores only the third effective address equivalent to the operand address 23-1 among the first through the third effective addresses in a different part (namely, the second part) of the buffer memory 22, an overflow of the effective address which should be stored in the buffer memory 22, is not liable to occur in the buffer memory 22 even when the effective address producing and storing arrangement 20 is supplied with a different indirect designation effective address processing instruction which makes the effective address producing and storing arrangement 20 produce a succession of an increased number of the effective addresses.

When an addressing exception occurs at the subsequent pipeline stages immediately after a trailing one of the first through the third effective addresses in the information processing system, operation of the information processing system is terminated for the trailing one of the first through the third effective addresses as described in the preamble of the instant specification. The trailing one of the first through the third effective addresses is equivalent to the operand address 23-1. It will again be supposed that the trailing one of the effective addresses and a preceding effective address immediately preceding the trailing one of the first through the third effective addresses are necessary as an exception address and a preceding factor address, respectively, in processing the addressing exception in the information processing system which operates under the control of exception firmware with reference to the buffer memory 22. The exception address is equivalent to an effective address at which the addressing exception occurs and which designates the operand address 23-1. The preceding factor address is equivalent to another effective address which precedes the exception processing address and which designates the direct descriptor address. In this case, the information processing system can deal with the addressing exception. This is because the preceding effective address and the trailing one of the first through the third effective addresses remain in the first and the second parts of the buffer memory 22 as the preceding factor address and the exception address, respectively.

On processing the addressing exception in practice, the information processing system reads, in accordance with a first instruction of the exception processing firmware, the third effective address (namely, the trailing one of the first through the third effective addresses) and the second designation indicating portion, equivalent to the direct designation indicating portion IND(P) of the logic "0" level, out of the second part of the buffer memory 22 at first. Subsequently, the information processing system reads, in accordance with a second instruction of the exception processing firmware, the second effective address (namely, the preceding effective address) and the first designation indicating portion equivalent to the indirect designation indicating portion IND(P) of the logic "1" level out of the first part of the buffer memory 22.

While this invention has thus far been described in specific conjunction with a preferred embodiment thereof, it will now be readily possible for one skilled in the art to carry this invention into effect in various other manners. Above all, the indirect designation data descriptor may be three or more in number in the manner depicted in FIG. 2. In this event, a first indirect designation data descriptor is memorized in the main memory 23 at an indirect descriptor address 23-(N+2) and an N-th indirect designation data descriptor at the indirect descriptor address 23-3 mentioned before, where N represents an integer which is determined by the indirect designation effective address processing instruction. When the indirect designation data descriptors are three in number, the second indirect designation data descriptor coincides with the (N−1)-th indirect designation data descriptor.

What is claimed is:

1. An effective address producing and storing apparatus supplied with an indirect designation effective address processing instruction for producing a succession of first, second, and third effective addresses and for successively storing said first through said third effective addresses in a buffer memory of an information processing system comprising a main memory, a reading apparatus, and said buffer memory, said main memory memorizing an operand datum at an operand address, a direct designation data descriptor at a direct descriptor address, and an indirect designation data descriptor at an indirect descriptor address, said direct designation data descriptor comprising a direct designation indicating portion and a direct designation address portion representative of said operand address, said indirect designation data descriptor comprising an indirect designation indicating portion and an indirect designation address portion representative of said direct descriptor address, said indirect designation effective address processing instruction comprising an indirect designation indicating code and a source address section representative of said indirect descriptor address, said effective address producing and storing apparatus comprising:

an instruction register having first and second instruction register areas for memorizing said indirect designation indicating code and said source address section, said first instruction register area being connected to said buffer memory;

source address processing means connected to said second instruction register area for processing said source address section into a source accessing signal representative of said indirect descriptor address;

an effective address register connected to said source address processing means and said reading apparatus for memorizing said source accessing signal as said first effective address to use said source accessing signal in making said reading apparatus access to said indirect descriptor address in said main memory and read said indirect designation data descriptor as a first read-out data descriptor, said effective address register being connected to said buffer memory;

storing means connected to said buffer memory and said first instruction register area for storing said first effective address and said indirect designation indicating code in a first part of said buffer memory;

a descriptor register connected to said main memory and having first and second descriptor register areas for memorizing, as a first designation indicating portion and a first designation address portion, the indirect designation indicating and the indirect designation address portions, respectively, which are included in the indirect designation data descriptor read as said first read-out data descriptor, said first descriptor register area being connected to said buffer memory; and updating means connected to said second descriptor register area and said effective address register for updating said effective address register to make said effective address register memorize said first designation address portion as said second effective address instead of said first effective address;

said effective address register thereby using said first designation address portion in making said reading apparatus access to said direct descriptor address in said main memory and read said direct designation data descriptor as a second read-out data descriptor;

said storing means being furthermore connected to said first descriptor register area for storing said second effective address and said first designation indicating portion in said first part of said buffer memory instead of said first effective address and said indirect designation indicating code;

said descriptor register being furthermore connected to said main memory for memorizing, as a second designation indicating portion and a second designation address portion instead of said first designation indicating and said first designation address portions, the direct designation indicating and the direct designation address portions, respectively, which are included in the direct designation data descriptor read as said second read-out data descriptor;

said updating means further updating said effective address register to make said effective address register memorize said second designation address portion as said third effective address instead of said second effective address;

said effective address register thereby using said second designation address portion in making said reading apparatus access to said operand address and read said operand datum; and said storing means storing said third effective address and said second designation indicating portion in a second part of said buffer memory.

2. An effective address producing and storing apparatus for successively producing first, second, and third effective addresses by processing an indirect designation effective address processing instruction and for successively storing said first through said third effective addresses in a buffer memory of an information processing system comprising a main memory, a reading apparatus, and said buffer memory, said main memory memorizing an operand datum at an operand address, a direct designation data descriptor at a direct descriptor address, and an indirect designation data descriptor at an indirect descriptor address, said direct designation data descriptor comprising a direct designation indicating portion and a direct designation address portion representative of said operand address, said indirect designation data descriptor comprising an indirect designation indicating portion and an indirect designation address portion representative of said direct descriptor address, said indirect designation effective address processing instruction comprising an indirect designation indicating code and a source address section representative of said indirect descriptor address, said effective address producing and storing apparatus comprising:

an instruction register having first and second instruction register areas for memorizing said indirect designation indicating code and said source address section, said first instruction register area being connected to said buffer memory;

source address processing means connected to said second instruction register area for processing said source address section into a source accessing signal representative of said indirect descriptor address;

an effective address register connected to said source address processing means and said reading apparatus for memorizing said source accessing signal as said first effective address to use said source accessing signal in making said reading apparatus access to said indirect descriptor address in said main memory and read said indirect designation data descriptor as a first read-out data descriptor, said effective address register being connected to said buffer memory;

storing means connected to said buffer memory and said first instruction register area and energized by said indirect designation indicating code for storing said first effective address and said indirect designation indicating code in a first part of said buffer memory;

a descriptor register connected to said main memory and having first and second descriptor register areas for memorizing, as a first designation indicating portion and a first designation address portion, the indirect designation indicating and the indirect designation address portions which are collectively read as said first read-out data descriptor, said first descriptor register area being connected to said buffer memory; and updating means connected to said effective address register and said second descriptor register area for updating said effective address register to make said effective address register memorize said first designation address portion as said second effective address;

said effective address register thereby using said first designation address portion in making said reading apparatus access to said direct descriptor address in said main memory and read said direct designation data descriptor as a second read-out data descriptor;

said storing means being connected furthermore to said first descriptor register area and energized by said first designation indicating portion for storing said second effective address and said first designation indicating portion in said first part instead of said first effective address and said indirect designation indicating code;

said descriptor register also connected to said main memory for memorizing, as a second designation indicating portion and a second designation address portion instead of said first designation indicating and said first designation address portions, the direct designation indicating and the direct designation address portions which are collectively read as said first read-out data descriptor;

said updating means further updating said effective address register to make said effective address register memorize said second designation address portion as said third effective address;

said effective address register thereby using said second designation address portion in making said reading apparatus access to said operand address and read said operand datum; and said storing means being energized by said second designation indicating portion for storing said third effective address and said second designation indicating portion in a second part of said buffer memory.

3. An effective address producing and storing apparatus for successively producing a plurality of effective addresses by processing an indirect designation effective address processing instruction and for successively storing said effective addresses in a buffer memory of an information processing system comprising a main memory, a reading apparatus, and said buffer memory, said main memory memorizing an operand datum at an operand address, a direct designation data descriptor at a direct descriptor address, and first and second through N-th indirect designation data descriptors in sequence at first and second through N-th indirect descriptor addresses, where N represents an integer which is not less than one and is determined by said indirect designation effective address processing instruction, said direct designation data descriptor comprising a direct designation indicating portion and a direct designation address portion representative of said operand address, said first indirect designation data descriptor comprising an indirect designation indicating portion and a first indirect designation address portion representative of said second indirect descriptor address, an n-th indirect designation data descriptor being memorized at an n-th indirect descriptor address and comprising said indirect designation indicating portion and an n-th indirect designation address portion representative of an (n+1)-th indirect descriptor address, where n is consecutively variable from 2 to N, said (n+1)-th indirect designation address portion being said direct designation address portion when n is equal to N, said indirect designation effective address processing instruction comprising an indirect designation indicating code and a source address section representative of said first indirect descriptor address, said effective address producing and storing apparatus comprising:

an instruction register having first and second instruction register areas for memorizing said indirect designation indicating code and said source address section, said first instruction register area connected to said buffer memory;

source address processing means connected to said second instruction register area for processing said source address section into a source accessing signal representative of said first indirect descriptor address;

an effective address register connected to said source address processing means and said reading apparatus for memorizing said source accessing signal as a first effective address of said plurality of effective addresses to use said source accessing signal in making said reading apparatus access to said first indirect descriptor address in said main memory and read said first indirect designation data descriptor as a first read-out data descriptor, said effective address register being connected to said buffer memory;

storing means connected to said buffer memory and said first instruction register area and energized by said indirect designation indicating code for storing said first effective address and said indirect designation indicating code in a first part of said buffer memory;

a descriptor register connected to said main memory and having first and second descriptor register areas for memorizing, as a first designation indicating portion and a first designation address portion, the indirect designation indicating and the first indirect designation address portions which are collectively read as said first read-out data descriptor, said first descriptor register area being connected to 1 said buffer memory; and updating means connected to said effective address register and said second descriptor register area for updating said effective address register to make said effective address register memorize said first designation address portion as a second effective address of said plurality of effective addresses, said updating means updating said effective address register in this manner to make said effective address register memorize an n-th indirect descriptor address as an (n+1)-th effective address of said plurality of effective addresses instead of an n-th effective address of said plurality of effective addresses after said effective address register memorizes an (n−1)-th indirect descriptor address as an n-th effective address of said plurality of effective addresses to use said (n−1)-th indirect descriptor address in providing said reading apparatus access to said n-th indirect descriptor address and read said n-th indirect designation data descriptor as an n-th read-out data descriptor, after said descriptor register, also connected to said n-th indirect descriptor address, memorizes in said first and said second descriptor register areas, as an n-th designation indicating portion and an n-th designation address portion, the indirect designation indicating and the n-th indirect designation address portions which are collectively read as said n-th read-out data descriptor, and after said storing means, being additionally connected to said first descriptor register area, is energized by said n-th designation indicating portion to store said n-th effective address and said n-th designation address portion in said first part instead of an (n−1)-th effective address of said plurality of effective addresses and an (n−1)-th designation indicating portion which are stored in said first part prior to storage of said n-th effective address and said n-th designation indicating portion;

said updating means furthermore updating said effective address register to make said effective address register memorize said N-th indirect descriptor address as an ultimate effective address of said plurality of effective addresses instead of an N-th effective address of said plurality of effective addresses;

said effective address register meanwhile memorizing an (N−1)-th indirect descriptor address as said N-th effective address to use said (N−1)-th indirect descriptor address in making said reading apparatus access to said N-th indirect descriptor address and read said N-th indirect designation data descriptor as an N-th read-out data descriptor;

said descriptor register, also connected to said second register area, memorizing in said first and said second descriptor register areas, as an N-th designation indicating portion and an N-th designation address portion, the indirect designation indicating and the N-th indirect designation address portions which are collectively read as said N-th read-out data descriptor;

said storing means energized by said N-th designation indicating portion to store said N-th effective address and said N-th designation indicating portion in said first part instead of an (N−1)-th effective address of said plurality of effective addresses and an (N−1)-th designation indicating portion which are stored in said first part prior to storage of said N-th effective address and said N-th designation indicating portion;

said effective address register thereby using said N-th indirect descriptor address in making said reading apparatus access to said (N+1)-th indirect descriptor address and read said direct designation data descriptor as an ultimate read-out data descriptor;

said descriptor register being connected furthermore to said direct descriptor address for memorizing in said first and said second descriptor register areas, as an ultimate designation indicating portion and an ultimate designation address portion, said direct designation indicating and said direct designation address portions which are collectively read as said ultimate read-out data descriptor;

said storing means energized by said ultimate designation indicating portion to store said ultimate designation address portion as said ultimate effective address and said direct designation indicating portion in said first part instead of said N-th effective address and said N-th designation indicating portion;

said updating means eventually updating said effective address register to make said effective address register memorize said direct designation address portion in making said reading apparatus access to said operand address and read said operand datum; and said storing means being energized by said ultimate designation indicating portion for storing said ultimate effective address and said direct designation indicating portion in a second part of said buffer memory.

* * * * *